(12) United States Patent  
Liu et al.

(10) Patent No.: US 11,954,889 B2  
(45) Date of Patent: Apr. 9, 2024

(54) METHOD FOR PROCESSING DATA, AND SYSTEM, SYSTEM CONTROLLER AND MUDURE CONTROLLER

(71) Applicant: XI'AN NOVASTAR TECH CO., LTD., Shaanxi (CN)

(72) Inventors: Mengting Liu, Shaanxi (CN); Guifeng Wei, Shaanxi (CN)

(73) Assignee: XI'AN NOVASTAR TECH CO., LTD., Shaanxi (CN)

( * ) Notice: Subject to any disclaimer, the term of this patent is extended or adjusted under 35 U.S.C. 154(b) by 123 days.

(21) Appl. No.: 17/052,207

(22) PCT Filed: Jul. 31, 2019

(86) PCT No.: PCT/CN2019/098756  
§ 371 (c)(1),  
(2) Date: Nov. 2, 2020

(87) PCT Pub. No.: WO2021/016974  
PCT Pub. Date: Feb. 4, 2021

(65) Prior Publication Data  
US 2023/0162400 A1  May 25, 2023

(51) Int. Cl.  
*G06T 9/00* (2006.01)  
*G06F 3/14* (2006.01)  
(Continued)

(52) U.S. Cl.  
CPC .............. *G06T 9/00* (2013.01); *G06F 3/14* (2013.01); *G09G 5/36* (2013.01); *H04N 19/115* (2014.11);  
(Continued)

(58) Field of Classification Search  
CPC .............. H04N 19/188; H04N 19/115; H04N 21/43635; H04N 19/156; H04N 19/182;  
(Continued)

(56) References Cited

U.S. PATENT DOCUMENTS

2002/0051263 A1   5/2002  Mase  
2002/0059637 A1*  5/2002  Rakib ................... H04L 69/168  
                                                                 348/E5.103  
(Continued)

FOREIGN PATENT DOCUMENTS

CN       100407609 C  *  7/2008  .......... H04L 1/0041  
CN       102117191 A      7/2011  
(Continued)

OTHER PUBLICATIONS

Search Report for corresponding EP application No. 19934346.8.

*Primary Examiner* — Neil R Mikeska  
(74) *Attorney, Agent, or Firm* — Samson G. Yu (57) ABSTRACT

The embodiment of the disclosure discloses a method for processing data, a device for processing data, a system for processing data, a system controller and a mudure controller. The method includes: receiving input image data; storing the image data into a memory; reading target image data from the memory according to loaded area information of at least one output portal, wherein the output portal is electrically connected with a display screen, and the loaded area information of the output portal characterizes a target display area of the display screen; compressing the target image data to reduce the data volume of the target image data to meet a output bandwidth of the output portal to obtain compressed image data characterized by a plurality of image data packets; and outputting the compressed image data through the output portal.

12 Claims, 7 Drawing Sheets

(51) Int. Cl.
*G09G 5/36* (2006.01)
*H04N 19/115* (2014.01)
*H04N 19/182* (2014.01)

(52) U.S. Cl.
CPC ... *H04N 19/182* (2014.11); *G09G 2320/0233* (2013.01); *G09G 2320/0666* (2013.01)

(58) Field of Classification Search
CPC ........... G06F 3/14; G06F 3/1423; G09G 5/36; G09G 5/006; G09G 2360/04; G09G 2370/12; G09G 2340/02; G09G 2360/128; G09G 5/14; G09G 2320/0233; G09G 2320/0666; G06T 9/00
See application file for complete search history.

(56) References Cited

U.S. PATENT DOCUMENTS

| | | | | |
|---|---|---|---|---|
| 2005/0063473 | A1* | 3/2005 | Koyama | H04L 1/20 375/E7.279 |
| 2008/0124050 | A1* | 5/2008 | Deschamp | G11B 27/034 712/31 |
| 2009/0013236 | A1* | 1/2009 | Wu | H04L 1/0071 714/755 |
| 2010/0232518 | A1* | 9/2010 | Coleman, Sr. | H04N 21/25816 375/E7.005 |
| 2011/0157201 | A1 | 6/2011 | Hedges | |
| 2013/0265378 | A1* | 10/2013 | Abuan | G06F 3/0486 348/14.02 |
| 2014/0177710 | A1 | 6/2014 | Komi et al. | |
| 2017/0026697 | A1* | 1/2017 | Gordon | H04N 21/44016 |
| 2017/0064344 | A1* | 3/2017 | Petersen | H04N 21/44004 |
| 2017/0094301 | A1* | 3/2017 | Gu | H04N 19/503 |
| 2018/0090099 | A1 | 3/2018 | James | |
| 2018/0123847 | A1* | 5/2018 | Xu | H04L 1/009 |
| 2019/0273910 | A1* | 9/2019 | Malaika | G06F 3/011 |

FOREIGN PATENT DOCUMENTS

| | | |
|---|---|---|
| CN | 105282456 A | 1/2016 |
| CN | 105827996 A | 8/2016 |
| CN | 107038991 A | 8/2017 |
| CN | 108377394 A | 8/2018 |
| CN | 108810448 A | 11/2018 |

* cited by examiner

METHOD FOR PROCESSING DATA, AND SYSTEM, SYSTEM CONTROLLER AND MUDURE CONTROLLER

TECHNICAL FIELD

The disclosure relates to the technical field of data processing and display control, in particular to a method for processing data a device for processing data, a system for processing data, a system controller and a mudure controller.

BACKGROUND

At present, since the maximum bandwidth of a single network cable is 1 Gbps, a plurality of portals in a system controller are often required to respectively load a plurality of mudure controllers to realize driving display of a display screen when 1080P or even larger display screens of such as 4K are loaded. However, under the condition that a plurality of mudure controllers are loaded by a plurality of portals in the system controller, when a worker carries out screen configuration operation on the display screen, in addition to determining connecting lines between the mudure controllers, the display area of the mudure controllers loaded by each portal needs to be distinguished, which is inconvenient to the working staff, the whole framework connection becomes more complex, a plurality of wires are connected in a cross mode, the aesthetic feeling is reduced, and the popularization and use of the display screen are greatly reduced.

SUMMARY

In a first aspect of the embodiments of the disclosure, a method for processing data is provided, including: input image data is received: the image data in a memory is stored; target image data from the memory according to loaded area information of at least one output portal is read, wherein the output portal is electrically connected with a display screen, and the loaded area information of the output portal characterizes a target display area of the display screen; the target image data compressed to reduce the data volume of the target image data to meet a output bandwidth of the output portal to obtain compressed image data characterized by a plurality of image data packets; and the compressed image data through the output portal is output.

In some embodiments of the disclosure, a resolution size of the target display area is 1080P.

In some embodiments of disclosure, the compression process include: changing a coding format of each pixel data in the target image data.

In some embodiments of disclosure, the target display area of the display screen is driven and controlled by a plurality of cascaded mudure controllers, and a first-stage mudure controller of the plurality of cascaded mudure controllers is connected to the output portal through a cable; each image data packet includes identification codes of corresponding mudure controllers in the plurality of cascaded mudure controllers.

In a second aspect of the embodiments of the disclosure, provided is a device for processing data adapted to carry out a data processing method according to any one of the preceding first aspects, including: an input module used for receiving input image data; a storage module used for storing the image data into a memory; a reading module used for reading the target image data from the memory according to the loaded area information of the output portal, wherein the output portal is electrically connected with the display screen, and the loaded area information of the output portal characterizes the target display area of the display screen; a compression module used for carrying out compression processing on the target image data to reduce the data volume of the target image data to meet a output bandwidth of the output portal to obtain compressed image data characterized by a plurality of image data packets; and an output module used for outputting the compressed image data through the output portal.

In a third aspect of the embodiments of the disclosure, a system controller is provided, including: a video interface; an image processor connected with the video interface; a memory connected with the image processor; at least one output portal connected with the image processor; wherein the image processor is configured to execute the data processing method according to any one of the preceding first aspects.

In some embodiments of disclosure, the image processor includes: a video decoder connected with the video interface; a programmable logic device respectively connected with the video decoder, the memory and the at least one output portal; and the microcontroller is connected with the programmable logic device.

In a fourth aspect of the embodiments of the disclosure, a method for processing data is provided, including: an image data packet via an input portal to obtain compressed image data is received, wherein the input portal is a portal on a mudure controller electrically connected with a target display area of a display screen; the compressed image data to obtain decompressed image data is decompressed; the decompressed image data in a memory is stored; decompressed image data corresponding to the mudure controller from the memory is read; and driving and controlling the target display area of the display screen to carry out image display according to the read decompressed image data corresponding to the mudure controller.

In some embodiments of disclosure, before decompressing the compressed image data to obtain decompressed image data, the method further includes: a mudure controller identification code contained in the image data packet is parsed; and judging whether the mudure controller identification code is matched with the local identification code or not, to be used for determining whether to carry out decompression processing.

In some embodiments of disclosure, the reading of the decompressed image data corresponding to the mudure controller from the memory includes: intercepting the decompressed image data to obtain the decompressed image data corresponding to the mudure controller; before decompressing the compressed image data to obtain decompressed image data, the method further includes the following steps: forwarding the image data packet to a next-stage mudure controller cascaded with the mudure controller.

In some embodiments of disclosure, driving and controlling the target display area of the display screen for image display according to the read decompressed image data corresponding to the mudure controller includes: carrying out luminance correction and color gamut adjustment processing on the read decompressed image data corresponding to the mudure controller to obtain corrected image data; and driving and controlling the target display area of the display screen to display the image according to the corrected image data.

In a fifth aspect of the embodiments of the disclosure, a device for processing data adapted to carry out the data processing method of any of the afore-mentioned fourth aspects is provided, including: a receiving module used for receiving an image data packet through an input portal to obtain compressed image data, wherein the input portal is a portal on a mudure controller electrically connected with a target display area of the display screen; a decompression module used for decompressing the compressed image data to obtain decompressed image data; a storage module used for storing the decompressed image data into a memory; a reading module used for reading decompressed image data corresponding to the mudure controller from the memory; and a control module used for driving and controlling the target display area of the display screen to carry out image display according to the read decompressed image data.

In a sixth aspect of the embodiments of the disclosure, a mudure controller is provided, which includes at least one input portal; a programmable logic device connected with the at least one input portal; a microcontroller connected with the programmable logic device; and a memory connected with the programmable logic device; wherein the programmable logic device is configured to carry out the data processing method according to any one of the afore-mentioned fourth aspects.

In a seventh aspect of the embodiments of the disclosure, a system for processing data is provided, which includes: a system controller comprising at least one output portal; at least one mudure controller, each of which includes at least one input portal, wherein the input portal of a first-stage mudure controller in the at least one mudure controller is connected with the output portal of the system controller through a cable; wherein the system controller is configured to execute the data processing method according to any one of the preceding first aspects; the mudure controller is configured to execute the data processing method according to any one of the afore-mentioned fourth aspects.

BRIEF DESCRIPTION OF THE DRAWINGS

The accompanying drawings, which are included to provide a further understanding of the disclosure and are incorporated in and constitute a part of this disclosure, illustrate embodiments of the disclosure and together with the description serve to explain the disclosure and are not to be construed as unduly limiting the disclosure. In the drawings.

DESCRIPTION OF REFERENCE NUMERALS

S11-S15: a flow of a data processing method;
20: a data processing device; 21: a receiving module; 22: a storage module; 23: a reading module; 24: a compression module; 25: an output module;
30: a system controller; 31: a video interface; 32: an image processor; 33: a memory; 34: an output interface; 311: a video decoder; 312: a programmable logic device; 313: a microcontroller;
S41-S45: a flow of a data processing method;
50: a data processing device; 51: a receiving module; 52: a decompression module; 53: a storage module; 54: a reading module; 55: a control module;
60: a mudure controller; 61: inputting a portal; 62: a programmable logic device; 63: a microcontroller; 64: a memory;
70: a data processing system; 71: a system controller; 72: a mudure controller; 711: at least one output portal; 721: input portal.

DETAILED DESCRIPTION OF THE EMBODIMENTS

It should be noted that the embodiments and features in the embodiments herein may be combined with one another without conflict. The embodiments of the disclosure will now be described, by way of example, with reference to the accompanying drawings.

For a better understanding of the embodiments of the disclosure, reference will now be made to the accompanying drawings, the technical solutions in the embodiments of the embodiments of the disclosure will be clearly and completely described below with reference to the drawings in the embodiments of the embodiments of the disclosure, and it is obvious that the described embodiments are only some but not all embodiments of the embodiments of the disclosure. Based on the embodiments in the embodiments of the disclosure, all other embodiments obtained by a person skilled in the art without involving any inventive effort shall fall within the scope of protection of the embodiments of the disclosure.

It should be noted that the terms "first, second", and the like in the description and claims of the embodiments of the disclosure and in the above-mentioned drawings are used for distinguishing between similar objects and not necessarily for describing a particular order or sequential order. It is to be understood that the terms so used are interchangeable under appropriate circumstances such that the embodiments of the disclosure described herein are capable of operation in sequences other than those illustrated or described herein. Furthermore, the terms "includes, comprising", and "having", as well as any variations thereof, are intended to cover a non-exclusive inclusion, such that a process, method, system, article, or apparatus that includes a list of steps or elements is not necessarily limited to those steps or elements expressly listed, but may include other steps or elements not expressly listed or inherent to such process, method, article, or apparatus.

It should also be noted that the division of the various embodiments in this disclosure is for convenience of description only and should not be construed as a particular limitation, and that features of the various embodiments may be combined and referred to herein without departing from the scope of the disclosure.

First Embodiment

Figure 1:
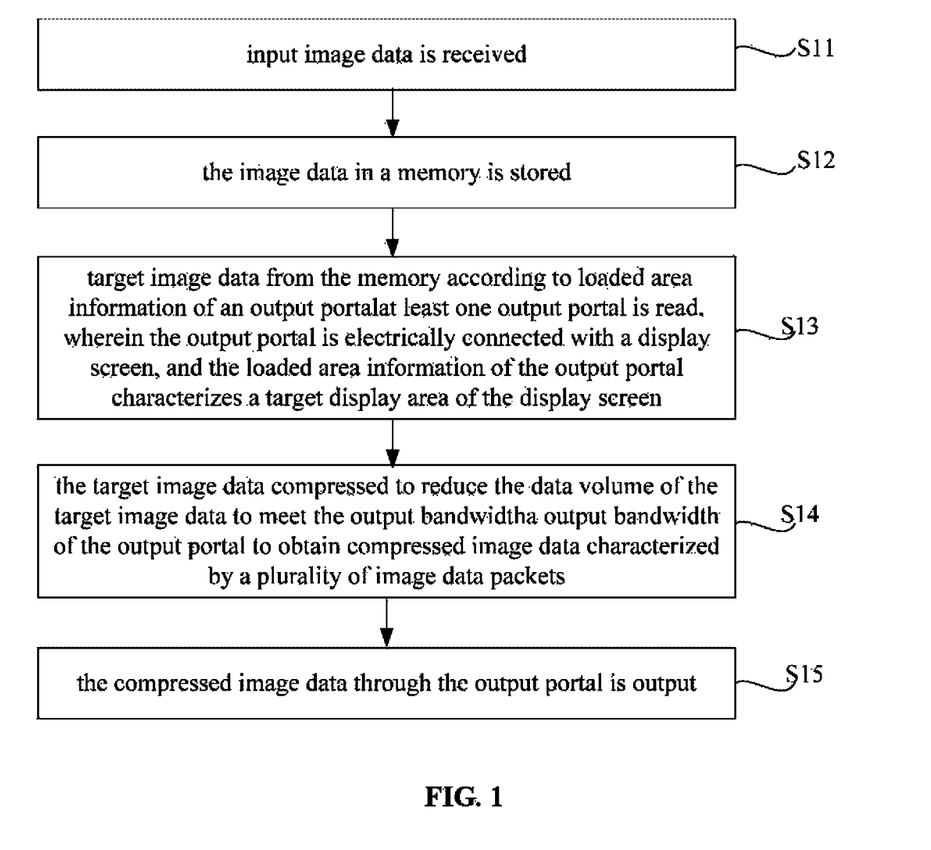
FIG. 1 is a flow diagram of a method for processing data according to a first embodiment of the embodiments of the disclosure.

Referring to FIG. 1, a first embodiment of the embodiments of the disclosure provides a data processing method. As shown in FIG. 1, the method for processing data provided in the first embodiment of the embodiments of the disclosure includes, for example, steps S11 to S15.

Step S11: input image data is received;
step S12: the image data in a memory is stored;
step S13: target image data from the memory according to loaded area information of at least one output portal is read, wherein the output portal is electrically connected with a display screen, and the loaded area information of the output portal characterizes a target display area of the display screen;
step S14: the target image data compressed to reduce the data volume of the target image data to meet a output bandwidth of the output portal to obtain compressed image data characterized by a plurality of image data packets;
step S15: the compressed image data through the output portal is output.

Specifically, the image data mentioned in step S11 is, for example, image data in DVI format or image data in HDMI format. The memory mentioned in step S12 is for example a dynamic random access memory. For example, DDR memory is used.

The loaded area information mentioned in step S13 characterizes the target display area of the display screen, for example, the loaded area information includes the starting coordinates of the image to be displayed of the target display area loaded by the output portal and the width and height of the image. A resolution size of the mentioned target display area is e.g. 1080P or greater. The mentioned display screens are, for example, spliced display screens formed, for example, by splicing a plurality of display units, wherein each display unit includes a plurality of display modules, and a single display module includes a plurality of LED light points. The display screen is for example an LED display screen. The target display area of the display screen is driven and controlled by a plurality of cascaded mudure controllers, for example, and a first-stage mudure controller in the cascaded mudure controllers is connected with the mentioned output portal through a cable.

The compression process mentioned in step S14 for example includes changing the encoding format of each pixel data in the target image data. The compression process may support low-latency visually lossless compression of image data, for example using an image compression algorithm such as JPEG2000. For example, when the output bandwidth of the output portal is 1 Gbps, the target image data is compressed and the amount of data transmitted by the target image data is reduced to below 1024 Mbit. Of course, the embodiments of the embodiments of the disclosure do not limit the output bandwidth of the output portal, and the compression process is similar when the output bandwidth is 5 Gbps.

Further, reference to an image data packet includes, for example, an identification code of a corresponding mudure controller among a plurality of cascaded mudure controllers. The identification code in the image data packet can ensure that each mudure controller under the output portal accurately identifies the image data to be loaded by the mudure controller so as to ensure that each mudure controller can accurately obtain the part of the image data controlled by the mudure controller. And after the mudure controller receives the image data packet, an identification code of the mudure controller is analyzed, and compared with a local identification code, and if the two identification codes are the same, the transmitted image data packet is determined to be the image data to be loaded by the mudure controller.

Figure 2:
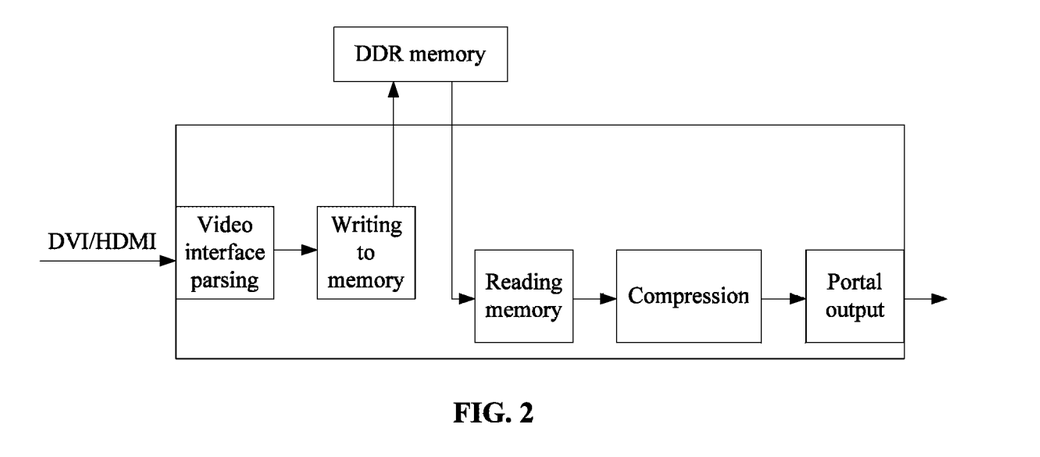
FIG. 2 is a data flow diagram of a system controller according to an embodiment of a method for processing data according to a first embodiment of the embodiments of the disclosure.

For a better understanding of the present embodiment, a detailed implementation of the method for processing data provided by the present embodiment is described below with reference to FIG. 2. The method for processing data provided by the embodiment is implemented in a system controller, wherein FIG. 2 is a data flow diagram of the system controller implementing the method of the embodiment.

Specifically, in the system controller, the video interface parses image data representing receipt of input and decodes the image data. The input image data is in a DVI format or an HDMI format, for example. Writing to memory indicates that the image data is cached in the DDR memory, and then the read memory indicates that the target image data is read out from the image data stored in the DDR memory according to the loaded area information corresponding to the target display area. The mentioned loaded area information includes the coordinates of the image to be displayed and the image width and height of the target display area under the portal. In consideration of the irregularity of the configuration of the special-shaped display screen, in order to reduce bandwidth waste, reading of image data and bit interception can be carried out in display units, i.e. a load area of each mudure controller, or reading of image data can be carried out in units of load areas of a single portal, and the embodiment is not limited to reading units of image data. Compression means that the target image data read out is compressed by a compression algorithm to reduce the amount of data transmitted. In addition, in order to satisfy the load of the display screen input by the 10-bit video source of 1080P, the transmission bandwidth of the 10-bit input source of the 1080P display screen can be calculated as 1920*1080*60*10*3=3.74 Gpbs, wherein 1920*1080 represents the resolution of the display screen, 60 represents the frame rate, 10 represents the bit depth of the input video source, and 3 represents the RGB three primary colors. When the network transmission bandwidth is 1 Gbps, the compression algorithm is needed to support four times lossless compression of image data. Of course when the bit depth of the input video source is higher, e.g. 12 bits, the corresponding compression algorithm may support a higher compression ratio while ensuring visual lossless. The compression process mentioned is, for example, to change the encoding format of each pixel data in the target image data to reduce the amount of transmission data of the target image data to meet the output bandwidth of the portal. The compressed image data obtained by the compression processing is characterized by a plurality of image data packets. The portal output indicates that the compressed image data is output to the mudure controller through the portal.

Furthermore, before the compressed image data is output, in order to ensure that the mudure controller under the portal can recognize the image data loaded by the mudure controller, the identification code of the corresponding mudure controller can be added into the image data packet, and at the moment, the corresponding image data packet is obtained by compressing the loaded area of each mudure controller as a unit.

In summary, according to the method for processing data provided by the embodiment, the target image data is compressed to reduce the data volume of the target image data to meet the output bandwidth of the output portal and then is output through the output portal, so that the limitation of transmission bandwidth of a single network line is eliminated, the loading requirement of a 1080P display screen loaded by the single network line is met, and a situation where a large-resolution display screen is loaded by too many network lines in the related art is avoided, the use of wires is reduced, and the cost is saved; the method has the advantages that tedious steps of determining various connection line relationships during screen configuration are avoided, workload is reduced for the working staff, efficiency is improved, cross connection of a plurality of wires is avoided, stability of a system is improved, aesthetic feeling is improved, which is advantageous for the popularization and use of a display screen.

Second Embodiment

Figure 3:
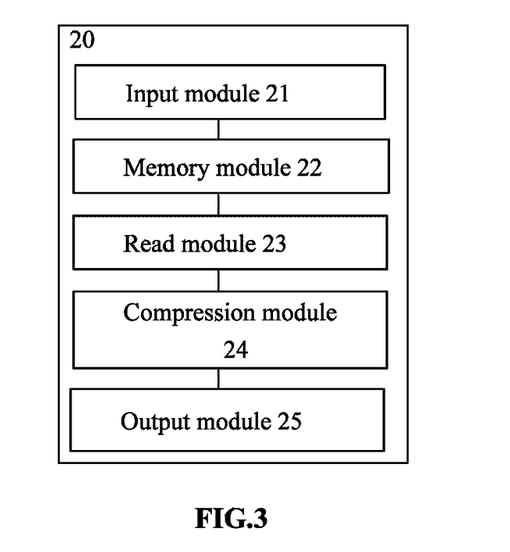
FIG. 3 is a schematic structural diagram of a device for processing data according to a second embodiment of the embodiments of the disclosure.

Referring to FIG. 3, a second embodiment of the embodiments of the disclosure provides a data processing device. As shown in FIG. 3, the device for processing data 20 includes, for example: a receiving module 21, a storage module 22, a reading module 23, a compression module 24 and an output module 25.

In particular, the input module 21 is adapted to receive input image data. The storage module 22 is used for storing the image data into a memory. And the reading module 23 is used for reading the target image data from the memory according to the loaded area information of at least one output portal, wherein the output portal is electrically connected with the display screen, and the loaded area information of the output portal characterizes the target display area of the display screen. The compression module 24 is used for loading out compression processing on the target image data to reduce the data volume of the target image data to meet a output bandwidth of the output portal so as to obtain compressed image data characterized by a plurality of image data packets. The output module 25 is used for outputting the compressed image data through the output portal.

The method for processing data implemented by the device for processing data 20 according to the present embodiment is as described in the afore-mentioned first embodiment and will not be described in detail herein. Alternatively, the various modules in the second embodiment, and the other operations or functions described above, respectively, are not described in detail herein for the sake of brevity in order to implement the method in the first embodiment of the embodiments of the disclosure.

In summary, the device for processing data provided by the embodiment compresses the target image data so as to reduce the data volume of the target image data to meet the output bandwidth of the output portal and then outputs the target image data through the output portal, so that the limitation of transmission bandwidth of a single network line is eliminated, the loading requirement of a 1080P display screen loaded by the single network line is met, and a situation where a large-resolution display screen is loaded by too many network lines in the related art is avoided, the use of wires is reduced, and the cost is saved; the method has the advantages that tedious steps of determining various connection line relationships during screen configuration are avoided, workload is reduced for the working staff, efficiency is improved, cross connection of a plurality of wires is avoided, stability of a system is improved, aesthetic feeling is improved, which is advantageous for the popularization and use of a display screen.

Third Embodiment

Figure 4:
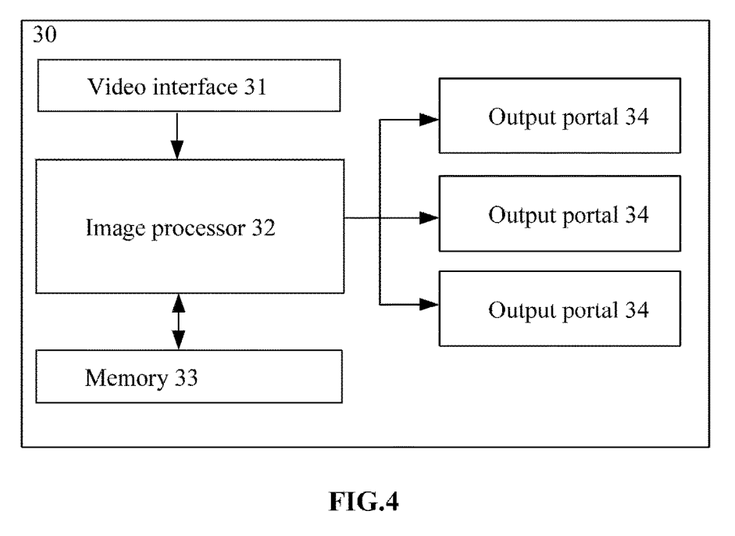
FIG. 4 is a structural diagram of a system controller according to a third embodiment of the embodiments of the disclosure.

Referring to FIG. 4, a third embodiment of the embodiments of the disclosure provides a system controller. As shown in FIG. 4, a system controller 30 includes, for example, a video interface 31, an image processor 32, a memory 33, and at least one output portal 34.

The image processor 32 is connected with the video interface 31, the memory 33 is connected with the image processor 32, and the at least one output portal 34 is connected with the image processor 32. The image processor 32 is used for executing the method for processing data as described in the first embodiment. For example, the image processor 32 is configured for:

(a) receiving input image data;
(b) storing the image data into a memory;
(c) reading target image data from the memory according to loaded area information of at least one output portal, wherein the output portal is electrically connected with a display screen, and the loaded area information of the output portal characterizes a target display area of the display screen;
(d) compressing the target image data to reduce the data volume of the target image data to meet a output bandwidth of the output portal to obtain compressed image data characterized by a plurality of image data packets; and
(e) outputting the compressed image data through the output portal.

Figure 5:
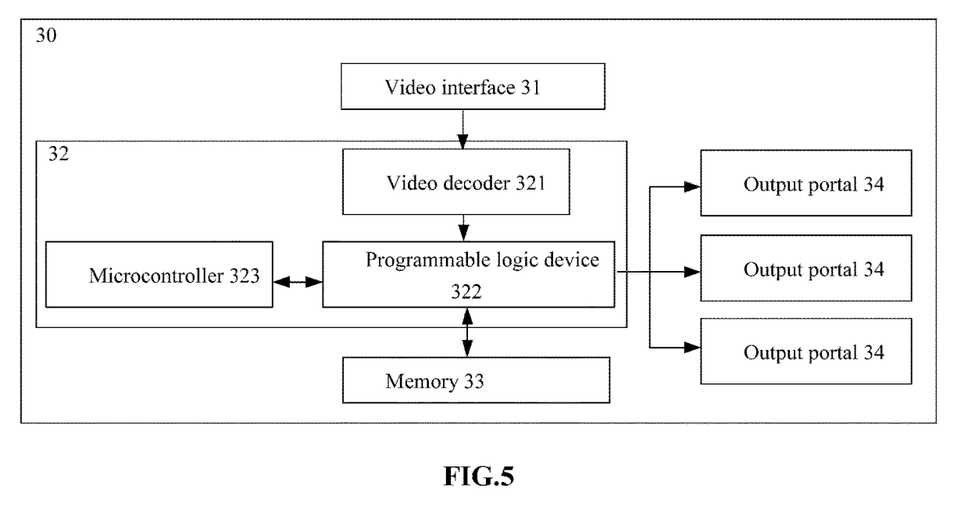
FIG. 5 is a structural diagram showing an internal structure of a system controller according to a third embodiment of the embodiments of the disclosure.

Further, as shown in FIG. 5, the image processor 32 includes, for example: a video decoder 321, a programmable logic device 322, and a microcontroller 323. The video decoding chip 321 is connected with the video interface 31, the programmable logic device 322 is connected with the video decoder 321, the memory 33 and the at least one output portal 34 respectively, and the microcontroller 323 is connected with the programmable logic device 322. The programmable logic device 322 carries out, for example, the method for processing data as described in the afore-mentioned first embodiment.

Further, the system controller 30 also includes, for example, a network PHY chip coupled between the output portal 34 and the programmable logic device 322.

Specifically, the video interface 31 is, for example, a DVI video interface or an HDMI video interface. The video decoder 321 corresponds to an HDMI video decoder or a DVI video decoder. The programmable logic device 322 is, for example, a Field-Programmable Gate Array (FPGA). The microcontroller 323 is for example a Microcontroller Unit (MCU), in particular an ARM core based MCU. The memory 33 is for example a dynamic random access memory, for example a DDR memory. The output portal 34 is, for example, an RJ45 portal.

The method for processing data realized by the system controller 30 provided by the embodiment is as described in the first embodiment, the specific steps can be described with reference to the first embodiment, and the detailed description will not be given here for the sake of brevity.

In summary, the system controller provided by the embodiment compresses the target image data so as to reduce the data volume of the target image data to meet the output bandwidth of the output portal and then outputs the target image data through the output portal, so that the limitation of transmission bandwidth of a single network line is eliminated, the loading requirement of a 1080P display screen loaded by the single network line is met, and a situation where a large-resolution display screen is loaded by too many network lines in the related art is avoided, the use of wires is reduced, and the cost is saved; the method has the advantages that tedious steps of determining various connection line relationships during screen configuration are avoided, workload is reduced for the working staff, efficiency is improved, cross connection of a plurality of wires is avoided, stability of a system is improved, aesthetic feeling is improved, which is advantageous for the popularization and use of a display screen.

Fourth Embodiment

Figure 6:
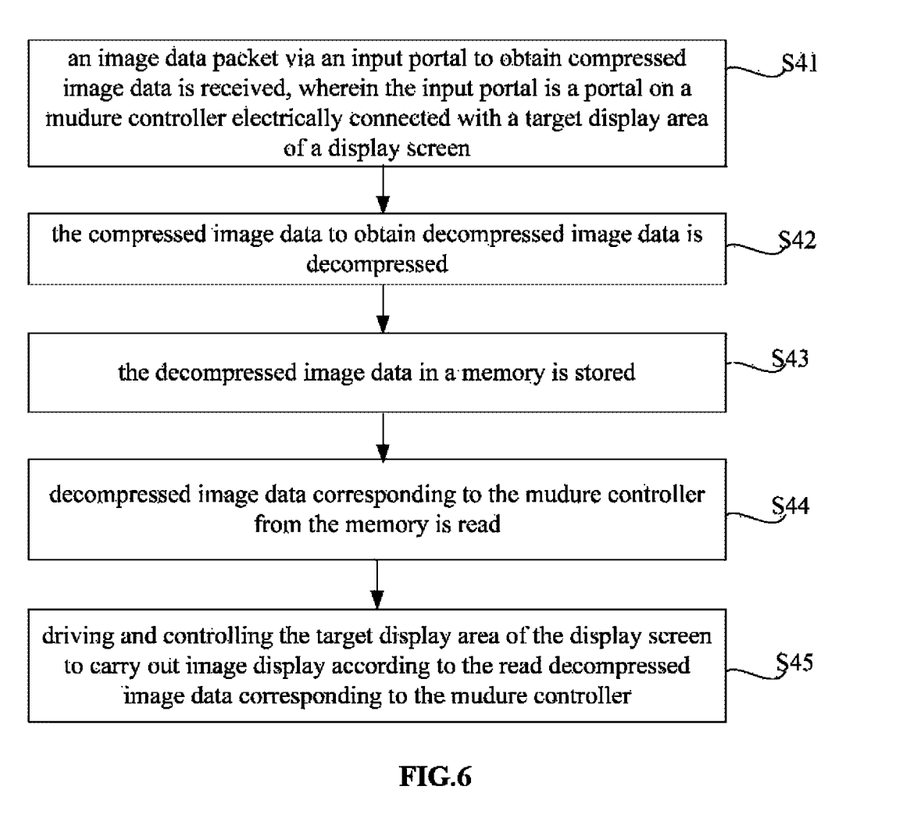
FIG. 6 is a flow diagram of a method for processing data according to a fourth embodiment of the embodiments of the disclosure.

Referring to FIG. 6, a fourth embodiment of the embodiments of the disclosure provides a method for data processing. As shown in FIG. 6, the method for processing data includes, for example, steps S41 to S45.

Step S41: an image data packet via an input portal to obtain compressed image data is received, wherein the input portal is a portal on a mudure controller electrically connected with a target display area of a display screen;

step S42: the compressed image data to obtain decompressed image data is decompressed;

step S43: the decompressed image data in a memory is stored;

step S44: decompressed image data corresponding to the mudure controller from the memory is read;

step S45: driving and controlling the target display area of the display screen to carry out image display according to the read decompressed image data corresponding to the mudure controller.

Specifically, in step S41, the mentioned image data packet includes compressed image data, or includes compressed image data and a mudure controller identification code. The display screen is for example a spliced display screen, and the display screen is formed by splicing a plurality of display units, wherein each display unit includes a plurality of display modules, and each display module includes a plurality of LED light points. The display screen is for example an LED display screen.

The decompression process mentioned in step S42 restores, for example, the encoding format of each pixel data in the target image data to the encoding format before the compression process. The memory mentioned in step S43 is for example a dynamic random access memory, for example a DDR memory. A resolution size of the target display area mentioned in step S45 is, for example, 1080P or greater. The target display area of the display screen is driven and controlled, for example, by a plurality of cascaded mudure controllers. Step S45 for example includes: carrying out luminance correction and color gamut adjustment processing on the read decompressed image data corresponding to the mudure controller to obtain corrected image data; and driving and controlling the target display area of the display screen to display the image according to the corrected image data.

Figure 7:
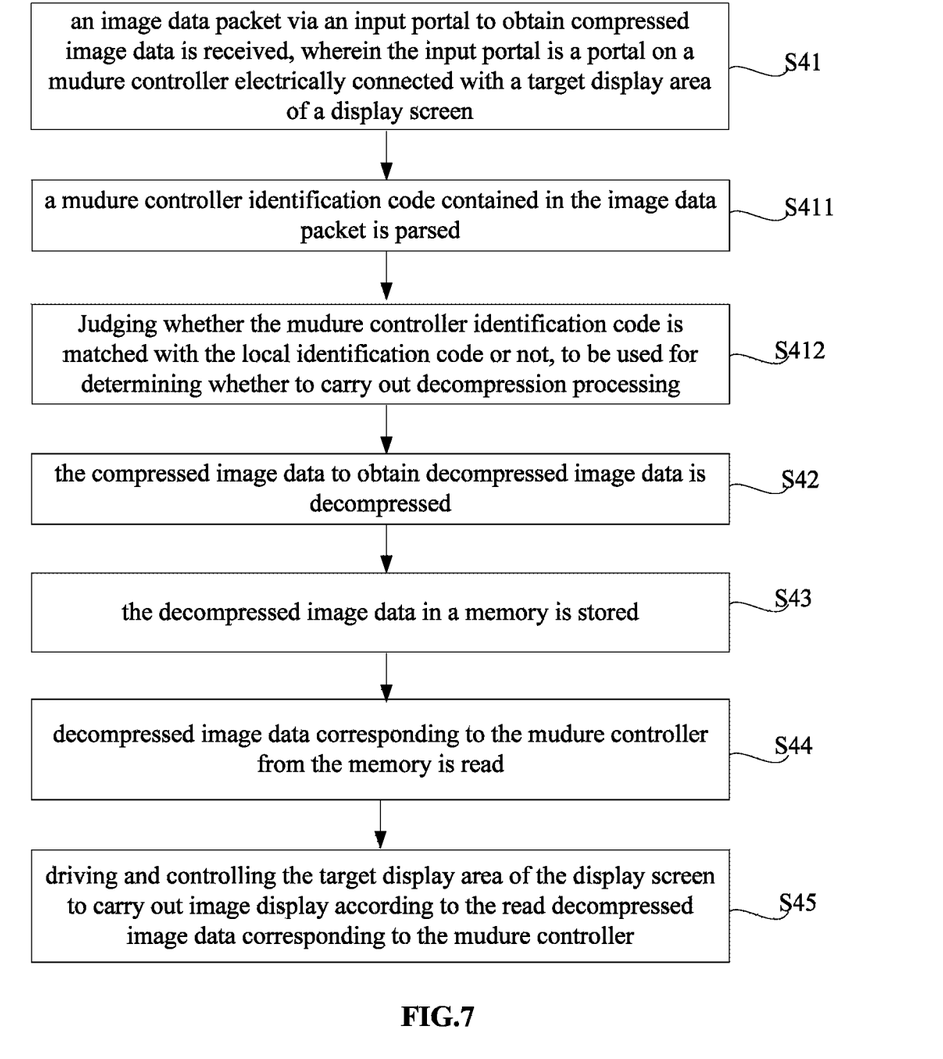
FIG. 7 is a further flow diagram of a method for processing data according to a fourth embodiment of the embodiments of the disclosure.

Further, when the mudure controller identification code is included in the image data packet, as shown in FIG. 7, step S411 and step S412 are further included before step S42, for example.

Step S411: an mudure controller identification code contained in the image data packet is parsed;

Step S412: and judging whether the mudure controller identification code is matched with the local identification code or not, to be used for determining whether to carry out decompression processing.

The image data packet at this time is compressed, for example, by taking the load area of each mudure controller as a unit. When the identification code of the controller of the module is judged to be matched with the local identification code, that is, the identification code of the controller is the same as the local identification code, decompression processing is carried out. If the mudure controller identification code and the local identification code are judged not to be matched, that is, the controller identification code and the local identification code are not the same, decompression processing is not carried out, and the received image data packet is forwarded to a next-stage mudure controller cascaded with the mudure controller. When the identification code of the mudure controller is judged to be matched with the local identification code, the decompressed image data obtained by decompressing the compressed image data is the decompressed image data corresponding to the mudure controller.

Furthermore, when no mudure controller identification code is included in the image data packet, the image data packet is compressed by taking a portal as a unit, and the decompressed image data obtained by decompressing the compressed image data is decompressed image data corresponding to a plurality of mudure controllers, not only the decompressed image data corresponding to the mudure controllers. Thus, step S44 includes, for example: intercepting the decompressed image data to obtain the decompressed image data corresponding to the mudure controller. The operation of intercepting the decompressed image data is, for example, intercepting the decompressed image data according to the initial coordinate, width and height of the load area of the mudure controller. Before the step S42, further included is: forwarding the image data packet to a next-stage mudure controller cascaded with the mudure controller. After receiving the image data packet, the next-stage mudure controller carries out decompression processing, image data interception and the like.

It should be noted that the method for processing data provided by the present embodiment is considered from the point of view of the mudure controller, and the method for processing data provided by the first embodiment is considered from the point of view of the system controller.

Figure 8:
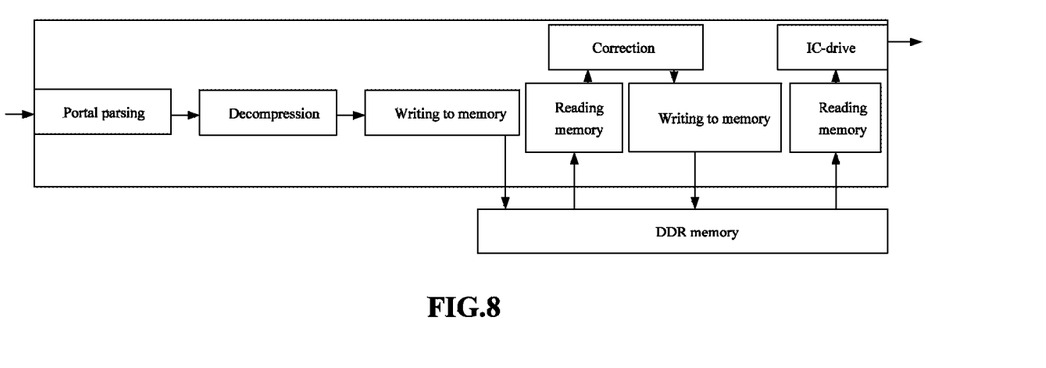
FIG. 8 is a data flow diagram of a mudure controller according to an embodiment of a method for processing data according to a fourth embodiment of the embodiments of the disclosure.

For a better understanding of the present embodiment, a detailed implementation of the method for processing data provided by the present embodiment is described below with reference to FIG. 8. The method for processing data provided by the embodiment is implemented in a mudure controller, wherein FIG. 8 is a data flow diagram of the mudure controller implementing the method of the embodiment.

In the mudure controller, the portal analytic representation carries out unpacking processing on the transmitted image data packet to obtain compressed image data. Decompression means buffering and decompressing the compressed image data to obtain decompressed image data. Writing to memory means saving decompressed image data to a DDR memory. The read memory indicates that the decompressed image data of the corresponding mudure controller is read from the DDR memory, and the decompressed image data of the corresponding mudure controller mentioned here is, for example, a part of the decompressed image data stored in the DDR memory, i.e. the decompressed image data of the corresponding mudure controller is obtained by intercepting the decompressed image data. The correction means carrying out luminance correction and color gamut adjustment processing on the decompressed image data of the corresponding mudure controller and then storing the decompressed image data in the DDR memory again. The IC driver means that the decompressed image data of the corresponding mudure controller is read from the DDR memory according to the chip time sequence requirement to drive and control the target display area of the display screen for image display. In addition, in the process, the mudure controller unconditionally forwards the received image data packet to a next-stage mudure controller cascaded with the mudure controller.

On the other hand, when the transmitted image data packet received by the mudure controller includes the mudure controller identification code, the portal parsing also indicates that the image data packet is unpacked to obtain the mudure controller identification code, at the moment, whether the mudure controller identification code and the local identification code are matched or not is judged firstly, and if the mudure controller identification code and the local identification code are not the same, the transmitted image data packet does not belong to the mudure controller, decompression processing cannot be carried out. The transmitted image data packet needs to be transmitted to the plurality of cascaded mudure controllers. If the mudure controller identification code and the local identification code are the same, decompression processing can be carried out. Decompression means buffering and decompressing the compressed image data to obtain decompressed image data. Writing to memory means saving decompressed image data to a DDR memory. Reading the memory means the decompressed image data of the corresponding mudure controller is read from the DDR memory, wherein the decompressed image data of the corresponding mudure controller is all the decompressed image data stored in the DDR memory. The correction means that the decompressed image data is subjected to luminance correction and color gamut adjustment processing and then stored in the DDR memory again. The IC driver means that the decompressed image data is read from the DDR memory according to chip timing requirements to drive and control a target display area of the display screen for image display.

In summary, according to the method for processing data provided by the embodiment of the disclosure, the compressed image data is decompressed and stored in the memory, and the decompressed image data of the corresponding mudure controller is read to drive and control the target display area to carry out image display, so that the limitation of transmission bandwidth of a single network line is eliminated, the loading requirement of a 1080P display screen loaded by the single network line is met, and a situation where a large-resolution display screen is loaded by too many network lines in the related art is avoided, the use of wires is reduced, and the cost is saved; the method has the advantages that tedious steps of determining various connection line relationships during screen configuration are avoided, workload is reduced for the working staff, efficiency is improved, cross connection of a plurality of wires is avoided, stability of a system is improved, aesthetic feeling is improved, which is advantageous for the popularization and use of a display screen.

Fifth Embodiment

Figure 9:
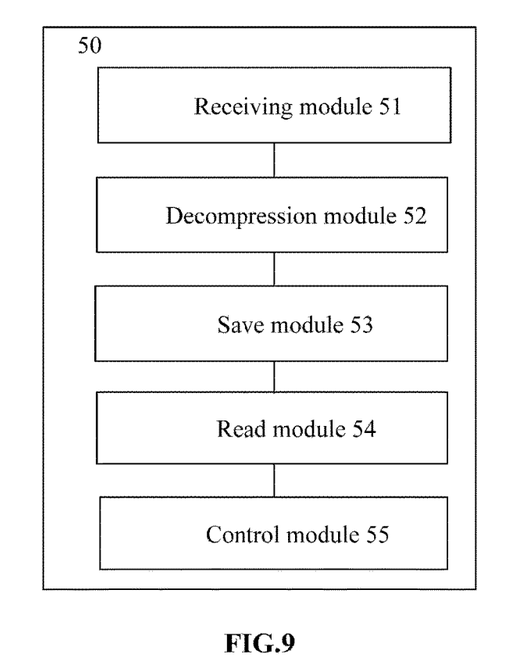
FIG. 9 is a schematic structural diagram of a device for processing data according to a fifth embodiment of the embodiments of the disclosure.

Referring to FIG. 9, a fifth embodiment of the embodiments of the disclosure provides a data processing device. As shown in FIG. 9, the device for processing data 50 includes, for example: a receiving module 51, a decompression module 52, a saving module 53, a reading module 54 and a control module 55.

The receiving module 51 is used for receiving an image data packet via an input portal to obtain compressed image data, wherein the input portal is a portal on a mudure controller electrically connected with a target display area of the display screen. The decompression module 52 is used for decompressing the compressed image data to obtain decompressed image data. The saving module 53 is used for saving the decompressed image data to a memory. The reading module 54 is used for reading decompressed image data corresponding to the mudure controller from the memory. And the control module 55 is used for driving and controlling the target display area of the display screen to carry out image display according to the read decompressed image data.

The method for processing data implemented by the device for processing data 50 according to the present embodiment is as described in the afore-mentioned fourth embodiment and will not be described in detail herein. Alternatively, the various modules in the fourth embodiment and the other operations or functions described above, respectively, are not described in detail herein for the sake of brevity in order to implement the method in the fourth embodiment of the embodiments of the disclosure.

In summary, according to the device for processing data provided by the embodiment, the compressed image data is decompressed and stored in the memory, and the decompressed image data of the corresponding mudure controller is read to drive the control target display area to carry out image display, so that the limitation of transmission bandwidth of a single network line is eliminated, the loading requirement of a 1080P display screen loaded by the single network line is met, and a situation where a large-resolution display screen is loaded by too many network lines in the related art is avoided, the use of wires is reduced, and the cost is saved; the method has the advantages that tedious steps of determining various connection line relationships during screen configuration are avoided, workload is reduced for the working staff, efficiency is improved, cross connection of a plurality of wires is avoided, stability of a system is improved, aesthetic feeling is improved, which is advantageous for the popularization and use of a display screen.

Sixth Embodiment

Figure 10:
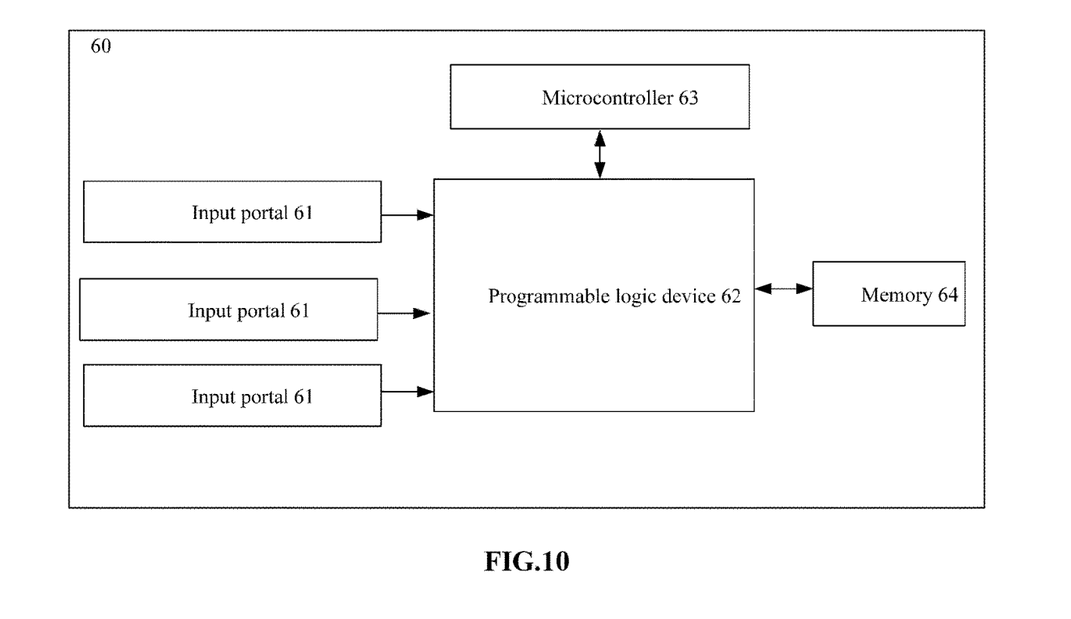
FIG. 10 is a structural diagram of a mudure controller according to a sixth embodiment of the embodiments of the disclosure.

Referring to FIG. 10, a sixth embodiment of the embodiments of the disclosure provides a mudure controller. As shown in FIG. 10, the mudure controller 60 includes, for example: at least one input portal 61, a programmable logic device 62, a microcontroller 63, and a memory 64.

The programmable logic device is connected with at least one input portal 61, the microcontroller 63 is connected with the programmable logic device 62, and the memory 64 is connected with the programmable logic device 62. The programmable logic device 62 is used to execute the method for processing data as described in the afore-mentioned fourth embodiment. For example, the programmable logic device 62 is used for:

(i) receiving an image data packet through an input portal to obtain compressed image data, wherein the input portal is a portal on a mudure controller electrically connected with a target display area of a display screen;

(ii) decompressing the compressed image data to obtain decompressed image data;

(iii) storing the decompressed image data in a memory;

(iv) reading decompressed image data corresponding to the mudure controller from the memory; and (v) driving and controlling the target display area of the display screen to carry out image display according to the read decompressed image data corresponding to the mudure controller.

Further, the mudure controller 60 includes, for example, a network PHY chip, temperature and voltage sampling circuits, and pin connectors. The network PHY chip is connected with the input portal 61 and the programmable logic device 62, the temperature and voltage sampling circuit is connected with the microcontroller 63, and the pin header connector is connected with the programmable logic device 62, wherein the pin header connector is used for being connected with the display module of the display screen.

Specifically, the input portal 61 is, for example, an RJ45 portal. The programmable logic device 62 is, for example, a Field-Programmable Gate Array (FPGA). The microcontroller 63 is for example a Microcontroller Unit (MCU), in particular an ARM core based MCU. The memory 64 is for example a dynamic random access memory, for example a DDR memory.

The method for processing data realized by the mudure controller 60 provided by the embodiment is as described in the fourth embodiment, and specific steps can be described with reference to the fourth embodiment.

In summary, according to the mudure controller provided by the embodiment, the compressed image data is decompressed and stored in the memory, and the decompressed image data of the corresponding mudure controller is read to drive the control target display area to carry out image display, so that the limitation of transmission bandwidth of a single network line is eliminated, the loading requirement of a 1080P display screen loaded by the single network line is met, and a situation where a large-resolution display screen is loaded by too many network lines in the related art is avoided, the use of wires is reduced, and the cost is saved; the method has the advantages that tedious steps of determining various connection line relationships during screen configuration are avoided, workload is reduced for the working staff, efficiency is improved, cross connection of a plurality of wires is avoided, stability of a system is improved, aesthetic feeling is improved, which is advantageous for the popularization and use of a display screen is improved, which is advantageous for the popularization and use of a display screen.

Seventh Embodiment

Figure 11:
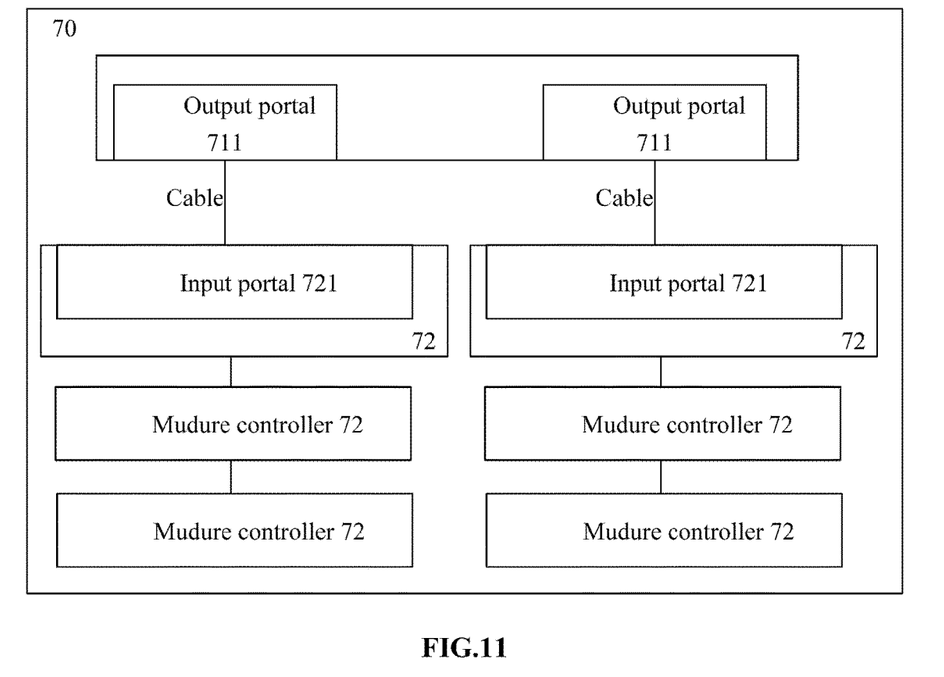
FIG. 11 is a structural diagram of a system for processing data according to a seventh embodiment of the embodiments of the disclosure.

Referring to FIG. 11, a seventh embodiment of the embodiments of the disclosure provides a data processing system. As shown in FIG. 11, the system for processing data 70 includes, for example: a system controller 71 and at least one mudure controller 72. The system controller 71 includes at least one output portal 711. Each mudure controller 72 includes at least one input portal 721, wherein the input portal 721 of the first-stage mudure controller 72 is connected to the output portal 711 of the system controller 71 via a cable.

The system controller illustrated in FIG. 11 includes two output portals 711 and six mudure controllers, but the disclosure is not limited thereto. The mentioned cable is for example a network cable, the maximum bandwidth of which is for example 1 Gbps.

It should be noted that the system controller 71 is, for example, the system controller 30 as described in the afore-mentioned third embodiment, the system controller 71 for carrying out the method for processing data as described in the afore-mentioned first embodiment, the mudure controller 71 is, for example, the mudure controller 60 as described in the afore-mentioned sixth embodiment, and the mudure controller 71 for carrying out the method for processing data as described in the afore-mentioned fourth embodiment, which will not be described in detail herein for the sake of brevity.

Figure 12:
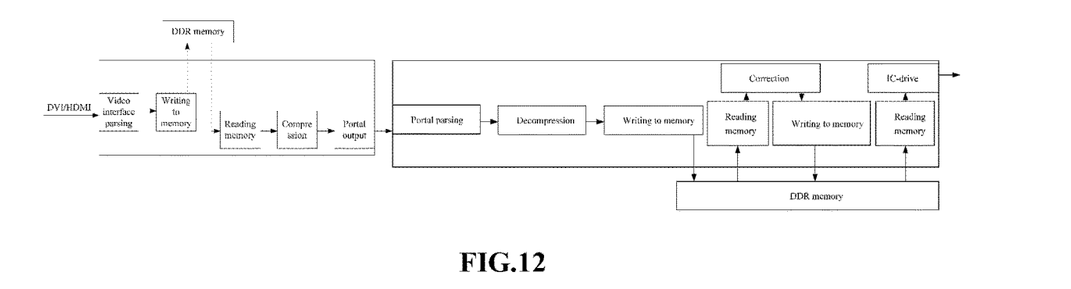
FIG. 12 is a data flow diagram of an embodiment of a system for processing data according to a seventh embodiment of the embodiments of the disclosure.

For a better understanding of the present embodiment, the detailed operation of the system for processing data of the present embodiment will now be described with reference to FIG. 12. FIG. 12 is a data flow diagram of the system for processing data of the present embodiment.

Specifically, in the system controller, the video interface parses image data representing receipt of input and decodes the image data. The input image data is in a DVI format or an HDMI format, for example. Writing to memory indicates that the image data is cached in the DDR memory, and then the read memory indicates that the target image data is read out from the image data stored in the DDR memory according to the loaded area information corresponding to the target display area. The mentioned loaded area information includes the coordinates of the image to be displayed and the image width and height of the target display area under the portal. Here, in consideration of the irregularity of the configuration of the special-shaped display screen, in order to reduce the bandwidth waste, the reading of the image data and the bit interception can be carried out in display units, or the reading of the image data can be carried out in units of the loaded area of the single portal, and this embodiment does not limit the units for reading the image data. Compression means that the target image data read out is compressed by a compression algorithm to reduce the amount of data transmitted. In addition, in order to satisfy the load of the display screen input by the 10-bit video source of 1080P, the transmission bandwidth of the 10-bit input source of the 1080P display screen can be calculated as 1920*1080*60*10*3=3.74 Gpbs, wherein 1920*1080 represents the resolution of the display screen, 60 represents the frame rate, 10 represents the bit depth of the input video source, and 3 represents the RGB three primary colors. When the network transmission bandwidth is 1 Gbps, the compression algorithm is needed to support four times lossless compression of image data. Of course when the bit depth of the input video source is higher, e.g. 12 bits, the corresponding compression algorithm may support a higher compression ratio while ensuring visual lossless. The compression process mentioned is, for example, to change the encoding format of each pixel data in the target image data to reduce the amount of transmission data of the target image data to meet the output bandwidth of the portal. The compressed image data obtained by the compression processing is characterized by a plurality of image data packets. The portal output indicates that the compressed image data is output to the mudure controller through the portal.

Furthermore, before compressed image data are output, in order to ensure that the mudure controller under the portal can recognize the image data loaded by the mudure controller, an identification code corresponding to the mudure controller can be added into the image data packet.

In the mudure controller, when the transmitted image data packet does not include the mudure controller identification code, the image data packet is compressed by taking a portal as a unit, for example. And the portal parsing indicates that the transmitted image data packet is unpacked to obtain compressed image data. Decompression means buffering and decompressing the compressed image data to obtain decompressed image data. Writing to memory means saving decompressed image data to a DDR memory. The read memory indicates that the decompressed image data of the corresponding mudure controller is read from the DDR memory, and the decompressed image data of the corresponding mudure controller mentioned here is, for example, a part of the decompressed image data stored in the DDR memory, i.e. the decompressed image data of the corresponding mudure controller is obtained by intercepting the decompressed image data. The correction means carrying out luminance correction and color gamut adjustment processing on the decompressed image data of the corresponding mudure controller and then storing the decompressed image data in the DDR memory again. The IC driver means that the decompressed image data of the corresponding mudure controller is read from the DDR memory according to the chip time sequence requirement to drive and control the target display area of the display screen for image display. In addition, the mudure controller also forwards the image data packet to a next-stage mudure controller cascaded with the mudure controller.

On the other hand, when the transmitted image data packet received by the mudure controller includes the mudure controller identification code, the image data packet at the moment is obtained by compressing, for example, a load area of each mudure controller as a unit. The portal parsing also indicates that the image data packet is unpacked to obtain the mudure controller identification code, at the moment, the mudure controller judges whether the mudure controller identification code is matched with the local identification code or not, if the mudure controller identification code is not the same as the local identification code, the transmitted image data packet does not belong to the mudure controller, decompression processing cannot be carried out, and the transmitted image data packet needs to be transmitted to the next cascaded mudure controller. If the mudure controller identification code and the local identification code are the same, decompression processing can be carried out. Decompression means buffering and decompressing the compressed image data to obtain decompressed image data. Writing to memory means saving decompressed image data to a DDR memory. Reading the memory means reading the decompressed image data of the corresponding mudure controller from the DDR memory, for example, all the decompressed image data stored in the DDR memory. The correction means that the decompressed image data is subjected to luminance and chrominance correction processing and then stored in the DDR memory again. The IC driver means that the decompressed image data is read from the DDR memory according to chip timing requirements to drive and control a target display area of the display screen for image display.

In summary, in the system for processing data provided by the embodiment, the system controller compresses the target image data to meet a output bandwidth of the output portal and then outputs the compressed image data through the output portal, the mudure controller decompresses the compressed image data and stores the compressed image data in the memory, and reads the decompressed image data of the corresponding mudure controller to drive and control the target display area for image display, so that the limitation of transmission bandwidth of a single network line is eliminated, the loading requirement of a 1080P display screen loaded by the single network line is met, and a situation where a large-resolution display screen is loaded by too many network lines in the related art is avoided, the use of wires is reduced, and the cost is saved; the method has the advantages that tedious steps of determining various connection line relationships during screen configuration are avoided, workload is reduced for the working staff, efficiency is improved, cross connection of a plurality of wires is avoided, stability of a system is improved, aesthetic feeling is improved, which is advantageous for the popularization and use of a display screen is improved, which is advantageous for the popularization and use of a display screen.

From the above description of the embodiments, it will be clear to a person skilled in the art that the embodiments of the disclosure can be implemented by means of software plus the necessary general hardware platform. Based on this understanding, the technical solution of the embodiments of the disclosure, in essence or as part of its contribution to the related art, may be embodied in the form of a software product, which may be stored in a storage medium, such as ROM/RAM, optical and magnetic disks, etc., including instructions for causing a computer device (which may be a personal computer, a server, or a network device, etc.) to carry out the methods of the various embodiments or portions of the embodiments of the embodiments of the disclosure.

It will be apparent to a person skilled in the art that the various modules or method steps described above in the embodiments of the disclosure may be implemented using a general purpose computing device, either centralized on a single computing device or distributed across a network of computing devices, or alternatively implemented using program code executable by the computing devices, such that they may be stored in a memory device for execution by a computing device, or they may be implemented separately as individual integrated circuit modules, or as multiple modules or steps thereof as a single integrated circuit module. Thus, the embodiments of the disclosure are not limited to any particular combination of hardware and software.

The foregoing is merely a preferred embodiment of the disclosure and is not intended to limit the disclosure, as various modifications and changes therein will occur to a person skilled in the art. Any modifications, equivalents, improvements, etc. that come within the spirit and principles of this disclosure are intended to be included within the scope of this disclosure.

What is claimed is:

1. A method for processing data, comprising the following steps:
receiving input image data;
storing the image data into a memory;
reading target image data from the memory according to loaded area information of at least one output portal, wherein the output portal is electrically connected with a display screen, and the loaded area information of the output portal characterizes a target display area of the display screen;

compressing the target image data to reduce the data volume of the target image data to meet a output bandwidth of the output portal to obtain compressed image data characterized by a plurality of image data packets; and outputting the compressed image data through the output portal;

wherein each image data packet comprises identification codes of corresponding module controllers in the plurality of cascaded module controllers, the identification codes in the image data packet are used for identifying, by each module controller under the output portal, the image data to be loaded by the module controller.

2. The method for data processing as claimed in claim 1, wherein a resolution size of the target display area is 1080P.

3. The method for processing data as claimed in claim 1, wherein the compression processing comprises: changing a coding format of each pixel data in the target image data.

4. The method for processing data as claimed in claim 1, wherein the target display area of the display screen is driven and controlled by a plurality of cascaded module controllers, and a first-stage module controller of the plurality of cascaded module controllers is connected with the output portal through a cable.

5. A method for processing data, comprising the following steps:

receiving an image data packet through an input portal to obtain compressed image data, wherein the input portal is a portal on a module controller electrically connected with a target display area of a display screen;

decompressing the compressed image data to obtain decompressed image data;

storing the decompressed image data into a memory;

reading decompressed image data corresponding to the module controller from the memory; and driving and controlling the target display area of the display screen to carry out image display according to the read decompressed image data corresponding to the module controller;

wherein each image data packet comprises identification codes of corresponding module controllers in the plurality of cascaded module controllers, the identification codes in the image data packet are used for identifying, by each module controller under the input portal, the image data to be decompressed by the module controller.

6. The method for processing data as claimed in claim 5, wherein before the decompressing the compressed image data to obtain decompressed image data comprising:

parsing a module controller identification code contained in the image data packet; and judging whether the module controller identification code is matched with the local identification code or not, to be used for determining whether to carry out decompression processing.

7. The method for processing data as claimed in claim 5, wherein the reading of decompressed image data corresponding to the module controller from the memory comprises:

intercepting the decompressed image data to obtain the decompressed image data corresponding to the module controller;

before the decompressing the compressed image data to obtain decompressed image data, the method further comprises the following steps:

forwarding the image data packet to a next-stage module controller cascaded with the module controller.

8. The method for processing data as claimed in claim 5, wherein the driving control of the target display area of the display screen for image display according to the read decompressed image data corresponding to the module controller comprises:

carrying out luminance correction and color gamut adjustment processing on the read decompressed image data corresponding to the module controller to obtain corrected image data; and driving and controlling the target display area of the display screen to display the image according to the corrected image data.

9. A system for processing data, comprising:

a system controller comprising at least one output portal;

at least one module controller, each of which comprising at least one input portal, wherein the input portal of a first-stage module controller in the at least one module controller is connected with the output portal of the system controller through a cable;

wherein the system controller is used for executing the method for processing data as claimed in claim 1; the module controller is used for executing the method for processing data as claimed in claim 5.

10. The system for processing data as claimed in claim 9, wherein the system controller, comprising:

a video interface;

an image processor connected with the video interface;

a memory connected with the image processor;

at least one output portal connected with the image processor;

wherein the image processor is used for executing the method for processing data as claimed in claim 1.

11. The system controller of claim 10, wherein the image processor comprises:

a video decoder connected with the video interface;

a programmable logic device respectively connected with the video decoder, the memory and the at least one output portal; and a microcontroller connected with the programmable logic device.

12. The system for processing data as claimed in claim 9, wherein the Module controller, comprising:

at least one input portal;

a programmable logic device connected with the at least one input portal;

a microcontroller connected with the programmable logic device;

a memory connected with the programmable logic device;

wherein the programmable logic device is used for executing the method for processing data as claimed in claim 5.

* * * * *